United States Patent
Noguchi et al.

[11] Patent Number: 5,135,336
[45] Date of Patent: Aug. 4, 1992

[54] CUTTING-OFF TOOL

[75] Inventors: Kazuo Noguchi; Keiji Hirose; Sunao Setoguchi, all of Itami, Japan

[73] Assignee: Sumitomo Electric Industries, Ltd., Osaka, Japan

[21] Appl. No.: 552,686

[22] Filed: Jul. 11, 1990

[30] Foreign Application Priority Data

Jul. 18, 1989 [JP] Japan .................. 1-185667

[51] Int. Cl.$^5$ .................. B23P 15/28; B26D 1/00
[52] U.S. Cl. .................. 407/117
[58] Field of Search .................. 407/117, 100, 15; 82/15, 52

[56] References Cited

U.S. PATENT DOCUMENTS

| | | | |
|---|---|---|---|
| 2,424,041 | 7/1947 | Luers | 407/117 X |
| 2,502,922 | 4/1950 | Bura | 407/117 X |
| 3,656,219 | 4/1972 | Connelly | 407/117 |
| 4,834,592 | 5/1989 | Niebauer et al. | 407/117 X |

Primary Examiner—Larry I. Schwartz
Assistant Examiner—Julie R. Daulton
Attorney, Agent, or Firm—Wenderoth, Lind & Ponack

[57] ABSTRACT

A cutting-off tool having an insert having two side cutting edges formed by the ridge lines defined by a rake face and side flanks. These edges are chamfered so that the cutting edge at one side which is likely to hit the falling part of the material cut off is chamfered by a larger width than at the other side.

3 Claims, 1 Drawing Sheet

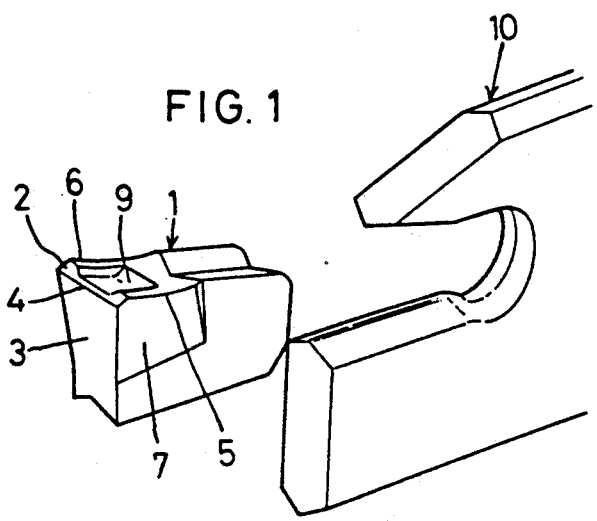
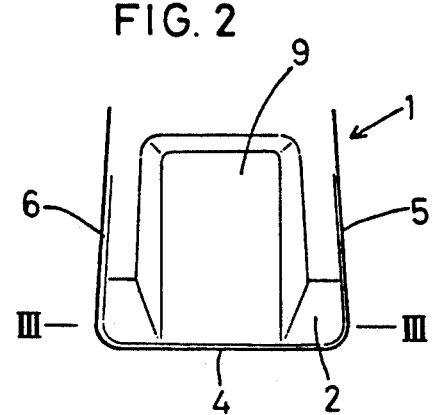
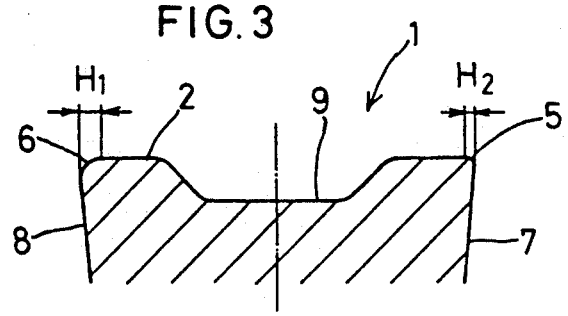
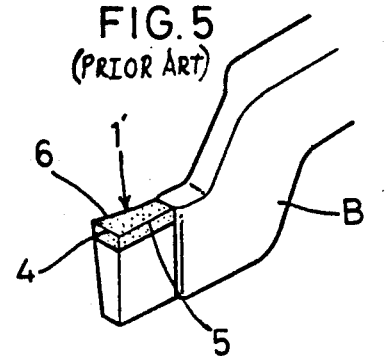
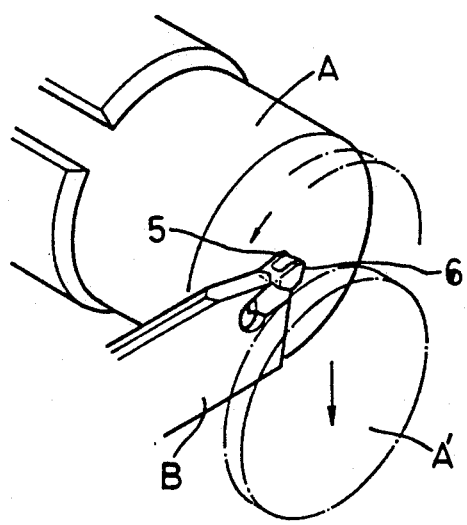
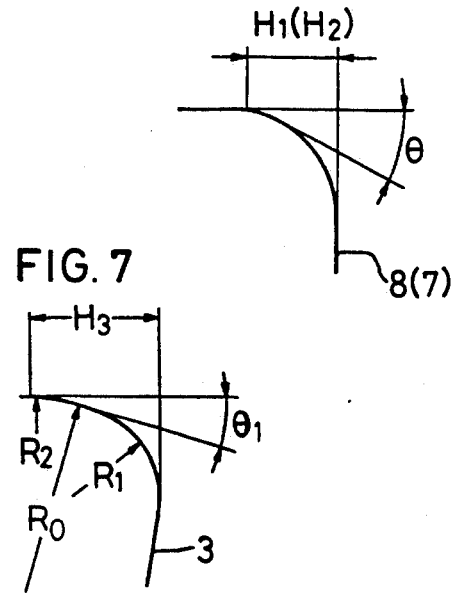
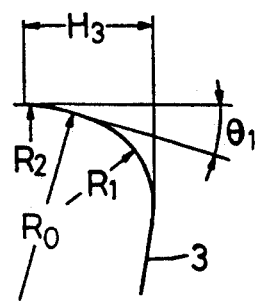

CUTTING-OFF TOOL

This invention relates to a cutting-off tool.

A cutting-off operation by a cutting-off tool poses peculiar problems. For example, as shown in FIG. 4: 1) Part A' of material A drops after being cut off. 2) When a cutting-off tool B is pulled back straight after moved forward for cutting-off, it tends to be abraded by contact with the material A being machined which is rotating by inertia, on a supporting chuck.

Concerning the first problem, if the material A' is inclined the moment it has been cut off, it might hit the cutting-off tool while dropping. This might damage a side cutting edge 6 at the righthand side of the Figure. Concerning the second problem, a side cutting edge 5 at the lefthand side might be worn or welded to the material A to be machined.

Such problems cannot be ignored in view of the fact that tools nowadays are made of expensive materials such as cemented carbide or a hard sintered compact which is even harder than the cemented carbide. But a tool which is free of these problems is yet to be found.

FIG. 5 shows a prior art cutting-off tool B. This tool B has an insert 1' brazed to a shank. A throw away type tool is also known in which the insert is detachable. In any case, since the cutting insert of the prior art cutting-off tool B has front and side cutting edges 4, 5 and 6 identical in shape to each other, it is difficult to evade both of the above-described problems caused to the side cutting edges 5 and 6.

It is an object of this invention to provide a cutting-off tool which has an ideal shape for obviating the abovesaid shortcomings.

In accordance with the present invention, one of the cutting edges at one side is chamfered by a width $H_1$ whereas the cutting edge at the other side is chamfered by a width $H_2$ and the widths $H_1$ and $H_2$ satisfy the following relations: $H_1 \geqq H_2$, $H_1 > 0.01$ mm, $H_2 \leqq 0.5$ mm It is well-known that a cutting edge can be strengthened by chamfering it. According to this invention, the side cutting edge at one side which may possibly collide with a falling material is chamfered by an amount $H_1$ (0.01 mm or more) which is larger than the amount by which the side cutting edge at the other side is chamfered to increase its resistance to breakage. Thus the cutting edge is less likely to break even if it collides with the material machined.

Since the side cutting edge at the other side has a chamfer amount $H_2$ which is smaller than $H_1$ within the range of 0.5 mm or less to keep its sharpness, the material to be machined will be ground if the tool gets into contact with the material when it returns to its original position. Thus wear owing to abrasion and welding will decrease.

The chamfer amount $H_1$ of the first-mentioned side cutting edge is limited to 0.01 mm or over. This is because though the smaller the $H_1$ value, the higher the sharpness of the edge, experimental results revealed that if the $H_1$ value is less than 0.01 mm, the edge tends to be broken more easily. Also, although the larger the $H_2$ value, the higher the strength of the edge, if the $H_2$ value is more than 0.5 mm, the sharpness of the edge is reduced remarkably.

With the cutting-off tool according to this invention, the side cutting edge which may collide with the material to be machined is chamfered sufficiently to prevent it from being broken, whereas the other side cutting edge is chamfered to a lesser degree to assure its sharpness. Thus the former side cutting edge is prevented from breaking and the other side edge is effectively prevented from wearing and welding. This will assure effective use of the tool.

Other features and objects of the present invention will become apparent from the following description taken with reference to the accompanying drawings, in which:

FIG. 1 is a perspective view of an embodiment according to this invention;

FIG. 2 is an enlarged plan view of the insert showing its edge;

FIG. 3 is a sectional view taken along line III—III of FIG. 2;

FIG. 4 is a perspective view showing how a material is cut off;

FIG. 5 is a perspective view of a prior art cutting-off tool;

FIG. 6 is a diagram of a side cutting edge showing its round honed shape; and

FIG. 7 is a diagram of a front cutting edge showing its round honed shape.

FIGS. 1 to 3 show a throw away cutting-off tool embodying this invention.

In these Figures, a throw away insert 1 and a clamp type holder 10 are shown.

The insert 1 has a front cutting edge 4 formed by the ridge line defined by a rake face 2 and a front flank 3, and side cutting edges 5 and 6 having their front ends connecting to both ends of the front cutting edge 4. The side cutting edge 5 at one side is formed by the ridge line defined by a side flank 7 and the rake face 2 and is subjected to round honing so as to be chamfered by a width $H_2$ (FIG. 3). The side cutting edge 6 at the other side is formed by the ridge line defined by a side flank 8 and the rake face 2 and is subjected to round honing so as to be chamfereed by a width $H_1$. The chamfered surface may be flat. In either case, the $H_1$ and $H_2$ values should be determined to meet the requirements that the minimum value of $H_1$ is 0.01 mm, the maximum value of $H_2$ is 0.5 mm, and $H_1 > H_2$.

In the Figures, numeral 9 designates a chip breaker groove. It serves to deform the chips in such a direction as to separate than from the surface to be machined. This facilitates chip discharge.

FIG. 6 shows a preferable shape of the chamfer of the side cutting edges 5 and 6 formed by round honing. In this Figure, the $H_1$ and $H_2$ values are within the aforementioned range. But preferably they should satisfy not only the relation, $H_1 > H_2$ but also the conditions of $H_2 = 0.02-0.04$ mm, $H_1 = 0.04-0.06$ mm, $\theta$ (angle of chamfer) should be 40–60 degrees.

FIG. 7 shows a preferable shape of the chamfer of the front cutting edge 4 formed by round honing. Among the radii of curvature at various portions of the chamfer, $R_0$ is larger than $R_1$ and $R_2$. Also, $R_1$ should be 0.04–0.06 mm, $H_3$ should be 0.08–0.12 mm and $\theta_1$ should be 8–15 degrees.

Such a round honed surface can be machined by pressing a disk-shaped brush grindstone with resin filaments containing diamond grains so that the filaments will contact the flank first and move off the insert from the rake face.

What is claimed is:

1. A cutting-off tool for cutting off a section of a workpiece; said tool having an insert defining a first side cutting edge and a second side cutting edge; each of said first and said second side cutting edges being formed by ridge lines defined by a rake face and side flanks; said first side cutting edge being located proximate to and immediately adjacent to the cut-off section of the workpiece; said first side cutting edge being chamfered by a width $H_1$; said second side cutting edge being chamfered by a width $H_2$; said widths $H_1$ and $H_2$ satisfying the following relations:

$H_1 > H_2$;
$H_1 \geq 0.01$ mm; and,
$H_2 \leq 0.5$ mm.

2. A cutting off tool as claimed in claim 1 in which said insert further has a front cutting edge defined by a ridge line defined by said rake face and a front flank.

3. A cutting off tool as claimed in claim 2 in which said front cutting edge is chamfered by a width $H_3$ in the range of 0.08 to 0.12mm.

* * * * *